United States Patent [19]

Nguyen et al.

[11] Patent Number: 5,196,712
[45] Date of Patent: Mar. 23, 1993

[54] PRINTED CIRCUIT BOARD APPARATUS WITH OPTICAL SWITCHING

[75] Inventors: Nguyen T. Nguyen, San Jose; Sharon Pellerin, San Francisco; Steven P. Saneski, Cupertino, all of Calif.

[73] Assignee: Raynet Corporation, Menlo Park, Calif.

[21] Appl. No.: 812,910

[22] Filed: Dec. 20, 1991

[51] Int. Cl.$^5$ .............................................. G02B 27/00
[52] U.S. Cl. ................................ 250/551; 250/227.11
[58] Field of Search .................. 250/551, 227.11, 239, 250/229; 307/311

[56] References Cited

U.S. PATENT DOCUMENTS

5,010,450  4/1991  Werdin et al. .................... 250/551

*Primary Examiner*—David C. Nelms
*Attorney, Agent, or Firm*—Dennis E. Kovach

[57] ABSTRACT

A printed circuit board apparatus includes a handle which has an extension plate which extends into an optical switch so as to prevent communication between an optical emitter and optical receiver. To remove the printed circuit board apparatus from its associated rack housing, rotation of the handle is first required which moves the plate and which causes the detector to go HIGH and signal to a telecommunications system that the board is soon to be removed so that a graceful switch can be made from that board to a redundant copy thereof. The printed circuit board apparatus further includes a deflectable lever which contacts to ground the rack housing upon inserting the printed circuit board apparatus into its associated rack housing so as to provide electrostatic discharge protection. The apparatus further includes a face plate which has a generic configuration so as to potentially accommodate any user interface permutation required by any printed circuit board to be inserted into the housing, with application specific labels being applied to each face plate to cover up any holes not providing any user interface information to a craftsperson for the associated printed circuit board. An electromagnetic interference gasket shield is also provided around a circumference of each printed circuit board assembly located in the rack housing.

14 Claims, 6 Drawing Sheets

FIG_1

FIG_2A

FIG_2B

FIG_2C

FIG_2D

FIG_3A

FIG_3B

PRINTED CIRCUIT BOARD APPARATUS WITH OPTICAL SWITCHING

BACKGROUND OF THE INVENTION

The present invention relates to an improved printed circuit board apparatus, and in particular to an improved face plate assembly for varying kinds of printed circuit boards which are to be mounted in a rack housing.

It is common in the telecommunications field to have rack housings which are intended to accommodate a plurality of printed circuit board assemblies therein, each assembly being mounted in the rack housing by sliding it inward so as to be parallel and closely adjacent to other printed circuit boards. Each circuit board has a plurality of electrical pins extending from its back end which commonly engage a like plurality of housing pin contacts, and through these pins and contacts signals pass so that integrated circuits and other electronic elements on the printed circuit boards can send and receive signals to and from other electronic components either situated within the particular rack housing in question or other electronic components electrically connected to the pin contacts of the rack housing.

Presently available printed circuit board assemblies suffer from a plurality of disadvantages. First, numerous printed circuit boards used in the telecommunications industry in particular are deemed to perform critical functions, and as such at least one redundant board is generally provided for each critical board so that in the event one of these critical boards fails the telecommunications system served by the critical board automatically switches over to the redundant board and thereafter utilizes the redundant board to perform operations required thereby so that system failure is prevented. With such critical boards, it is common to provide a manual switch on a face plate of the critical board which can be toggled prior to removing the critical board for inspection or other required work. Upon toggling of the switch, the critical board, which is in its active mode, is disabled and replaced by the redundant board in what is commonly known as a graceful transition by electronics associated with the telecommunications system. Such graceful transitions generally are made at a convenient processing time for microprocessors associated with the telecommunications system, for example at the end of an information frame or superframe, as opposed to instantaneously within the middle of a frame and possibly even in the middle of a packet or byte contained in the frame. Commonly, numerous graceful transition instants occur each second. A disadvantage with such face plates is that oftentimes a craftsperson forgets to activate the switch prior to removing an active critical board whereby the telecommunications system is forced to enter its failure switching mode which, if occurring at an inconvenient instant, can result in lost data, lost data cycling efficiency, and false system alarms.

Printed circuit board assemblies also have to guard against electrostatic discharges which can be caused by static electricity associated with a board being inserted into a rack housing and/or static electricity on a craftsperson handling the board when inserting it into a rack housing. A common construction for guarding against electrostatic discharge is to provide an elongated grounding pin at the back of the printed circuit board which makes contact with the rack housing prior to any signaling pins associated with the printed circuit board, with the elongated pin thereby discharging any undesired electrostatic charges present to ground via the rack housing. This design solution is relatively expensive.

Finally, any rack housing which accommodates several boards, such as 10-20 boards or more, necessarily houses boards having different functions and boards which require different user interfaces such as varying unique arrangement of lights on a face plate thereof for communicating information to a craftsperson such as power ON, power OFF, unique component failures, etc. Individually machining each face plate to accommodate its unique user interface design tends to be inefficient and costly.

SUMMARY OF THE INVENTION

It is an object of the present invention to eliminate the abovenoted drawbacks and to provide a printed circuit board assembly which is simpler in design, is more user friendly, is more reliable in design, and is less costly than printed circuit board assemblies heretofore proposed.

It is a further object of the invention to provide a face plate assembly for a critical printed circuit board which is capable of automatically signaling to a telecommunications system to gracefully switch over to a redundant board prior to removing the critical printed circuit board from its rack housing.

It is a yet further object of the invention to provide a face plate assembly for a printed circuit board which is capable of discharging electrostatic charges automatically upon insertion of the printed circuit board into the rack housing long before any signaling pins associated with the printed circuit board make contact with any contacts of the rack housing.

It is yet a further object of the invention to provide a face plate assembly for a plurality of printed circuit boards which allows each individual face plate for printed circuit boards having widely differing functions to be constructed each in an identical manner, with unique user interface differences therebetween being provided on an inexpensive label to be attached to a front surface of each face plate.

These and other objects of the invention are achieved by a printed circuit board apparatus which is removeably contained in a printed circuit board housing, comprising:

a printed circuit board on which electrical elements are fixed;

a face plate attached to a front end of the printed circuit board;

a moveable handle attached to and extending from the face plate which is moveable between first and second positions;

means for securing the board and the face plate to the housing when the handle is in its first position and for releasing the board and the face plate from the housing when the handle is in its second position so that the board can be removed from the housing and upon removal electrical contacts contained in the housing are electrically disconnected from electrical pins extending from a back end of the board, the electrical contacts being part of an electrical path for signals being transmitted between the board elements and other electronic components;

an optical switch including a light emitter, a light detector for detecting light emitted by the light emitter, and means for instructing at least one of the other electronic components to gracefully inactivate the printed circuit board and switch to a redundant printed circuit board when an output level of the detector is changed by moving the handle between its first and second positions.

It is yet a further object of the present invention to provide a printed circuit board apparatus which is removeably contained in a printed circuit board housing, comprising:

a printed circuit board on which electrical elements are fixed;

a face plate attached to a front end of the printed circuit board and being electrically connected thereto, the face plate including a deflectable conductive lever oriented such that upon inserting the printed circuit board into the housing the conductive lever makes electrical contact with an electrically conducting portion of the housing prior to any electrical pins extending from a back end of the printed circuit board making electrical contact with any associated electrical pin contacts associated with the housing so as to discharge to ground any electrostatic charge associated with the printed circuit board.

Further objects of the present invention are to provide a host terminal for a telecommunications system, comprising:

a rack housing;

a plurality of printed circuit board assemblies removeably contained in the rack housing, each printed circuit board assembly having a front edge secured to a face plate, each face plate having a common configuration such that each has an identical arrangement of holes in a front surface thereof to allow a craftsperson visual inspection of LEDs to be associated with any hole, the arrangement of holes being capable of accommodating any LED arrangement permutation required by any board assembly being housed in the rack housing, each printed circuit board assembly having a label secured to a front face of its associated face plate, each label having holes only at locations which correspond to those areas where LEDs to be visually inspected associated with a corresponding printed circuit board are to exist such that face plate holes which do not have LEDs to be visually inspected are covered by the labels.

Preferably, each label has written indicia thereon specifying an identity of its associated printed circuit board and which identifies a function represented by each of its board LEDs, and the housing accommodates at least ten circuit board assemblies.

These and other objects of the invention will be more clearly understood by reference to the following detailed description and drawings.

DETAILED DESCRIPTION OF THE PREFERRED EMBODIMENT

Figure 1:
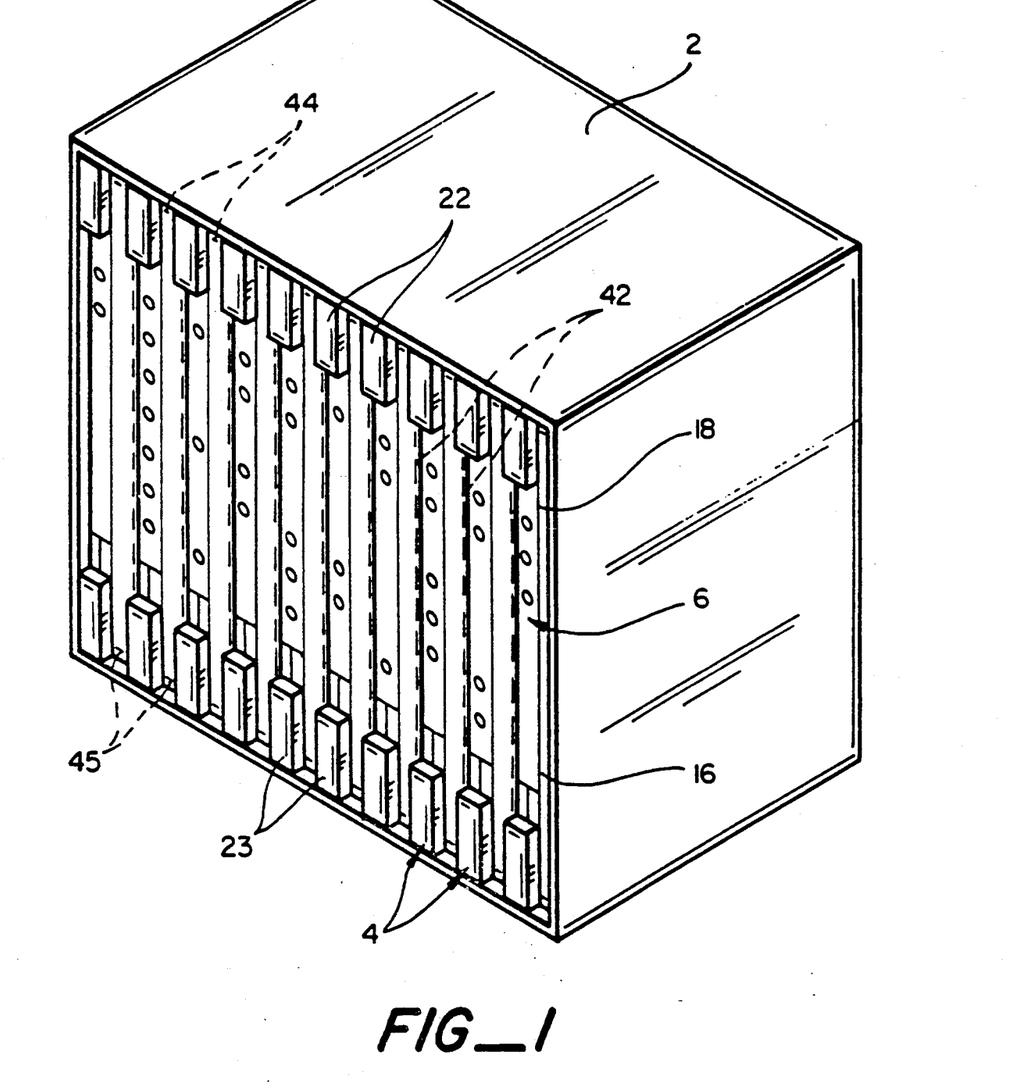
FIG. 1 is a perspective view of a rack housing containing a plurality of printed circuit board assemblies.

FIG. 1 illustrates a telecommunications rack housing 2 which houses a plurality of printed circuit board assemblies 4 arranged so as to be adjacent and parallel to one another and so that electromagnetic interference gasket shields 42 contact adjacent sides of face plates 16 associated with the assemblies. Each printed circuit board assembly 4 is insertable into and removeable from the housing 2 by sliding the board along guide grooves (not shown) located on an interior floor and ceiling surface of the housing 2. Each printed circuit board assembly 4 has a user interface 6 which communicates certain information via lights and written indicia, such as the identify or function of the printed circuit board, the status of certain board or system functions of either that particular printed circuit board or other components associated with the telecommunications system, etc. Such information is commonly conveyed by an illumination or lack of illumination of various light emitters, such as colored LEDs. For example, referring to FIG. 2, the user interface 6 contains three LEDs, LEDs 8, 10, 12, LED 8 preferably being a green color and when lit indicating that the DFM board shown is in an active state, the LED 10 preferably being red and when illuminated indicating the DFM board has failed or is inoperative, and the LED 12 preferably indicating when illuminated that another component associated with the telecommunication system, such as an SIU, has power, and when not illuminated is experiencing a power failure.

Referring back to FIG. 1, it is readily apparent that different printed circuit boards associated with different printed circuit board assemblies 4 will have different functions and accordingly have differing needs as to the amount of and type of information which needs to be visually conveyed to a craftsperson, as well as its arrangement on the user interface 6.

According to a first aspect of the invention, each printed circuit board 14 has a front edge attached to a face plate 16, with each face plate 16 of all the various printed circuit board assemblies 4 in any particular rack housing 2 having an identical construction. Specifically, the face plate 16 is designed so as to have holes or apertures spaced along its length so as to accommodate any and all possible user interface permutations required by any printed circuit board assembly 4 to be housed preferably in any of the rack housings of the system. Accordingly, as illustrated in FIG. 2, the face plate 16 has a plurality of holes 20. To accommodate the specific needs of any particular printed circuit board assembly 4, application specific labels 18 are produced which have holes 8, 10, 12 situated in those locations where illuminated LEDs along the user interface are desired, and communication written indicia 20 are also situated where appropriate information is desired to be conveyed to a craftsperson, such as the identity or function of any particular LED associated with any particular hole, 8, 10, 12, as well as an identity of the particular board, in the example of FIG. 1B the board being a "DFM" board, trademark information, etc.. With this arrangement, it is readily evident that the manufacturing cost of the face plate can be significantly reduced since it is a generic common design which can be produced in volume without requiring design differences depending on what particular printed circuit board is to be attached to it. The labels can be specifically designed so as to have board specific and unique characteristics, and since labels are a relatively low system cost component the incremental cost of producing several differing formats of labels is negligible compared to that saved by having to produce only one generic face plate design. According to this aspect of the invention, at time of assembly of a printed circuit board assembly, a customized label is attached to an end of each face plate, the label being chosen so as to have the correct board name and other board specific indicia and apertures thereon, the label being attached to the face plate so that the apertures of the label overlay and are aligned with only holes on the face plate which are aligned with communicating user interface electronic elements, such as colored LEDs. Holes in the face plate which are not associated with any such LEDs are covered by the label.

Figure 2A:
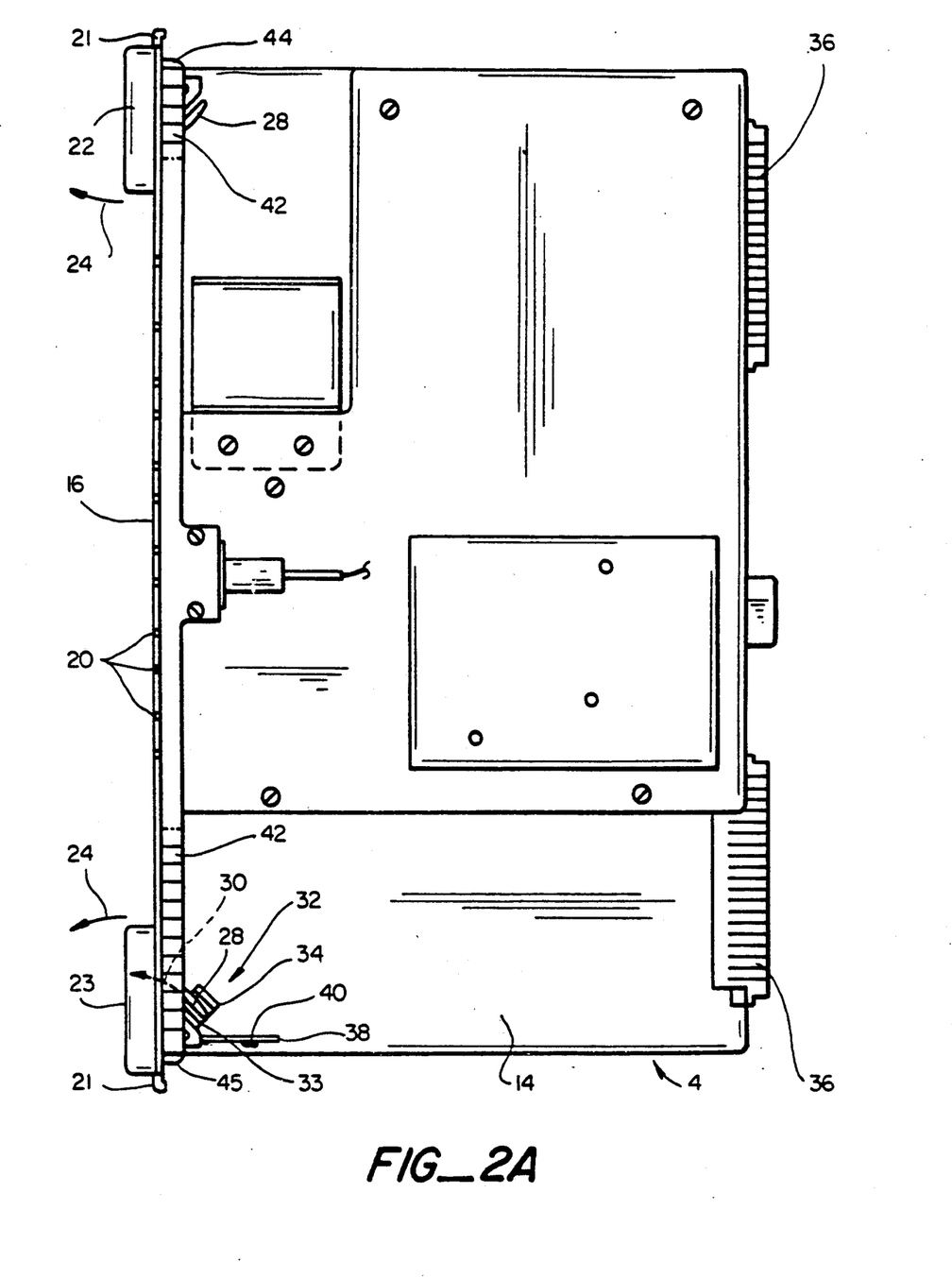
FIGS. 2A-2D are top, side, and first and second end views of a printed circuit board assembly constructed according to the principles of the present invention.
Figure 2B:
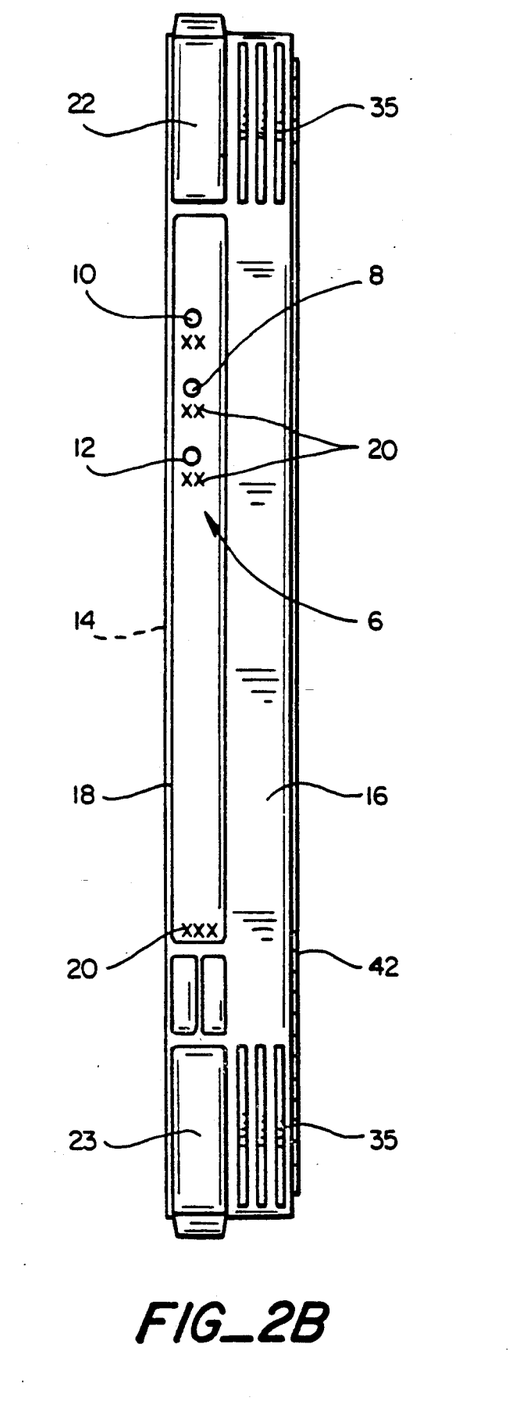
Figure 2C:
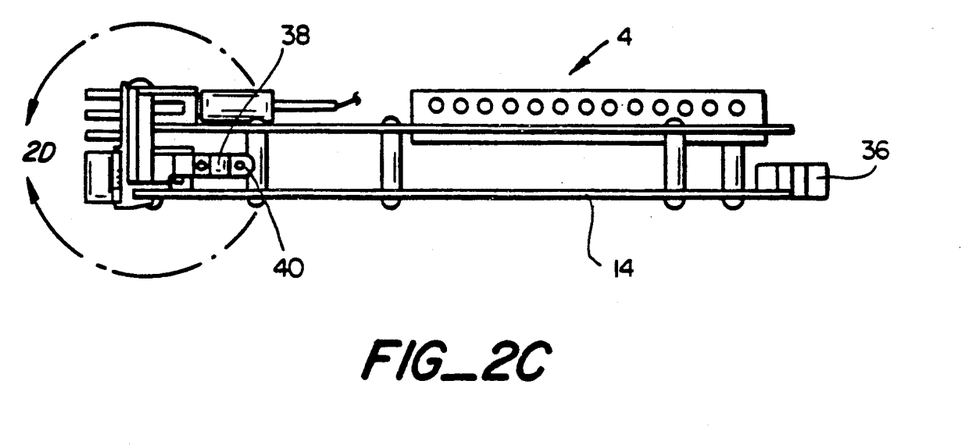
Figure 2D:
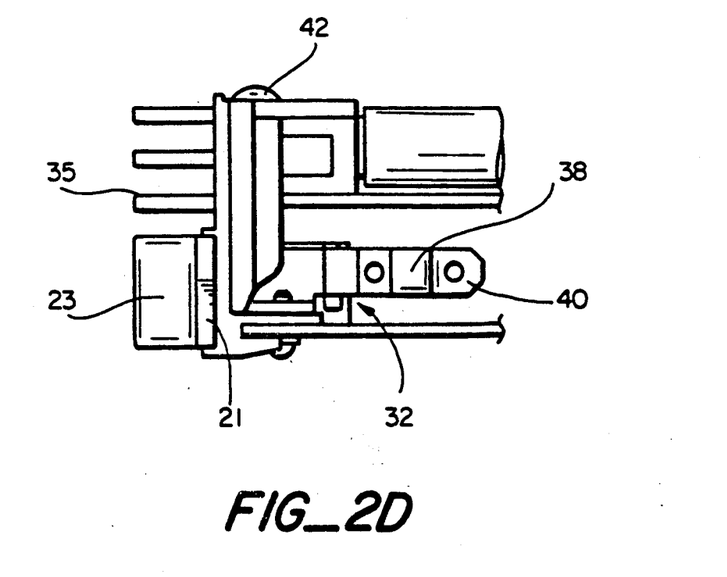
Figure 3A:
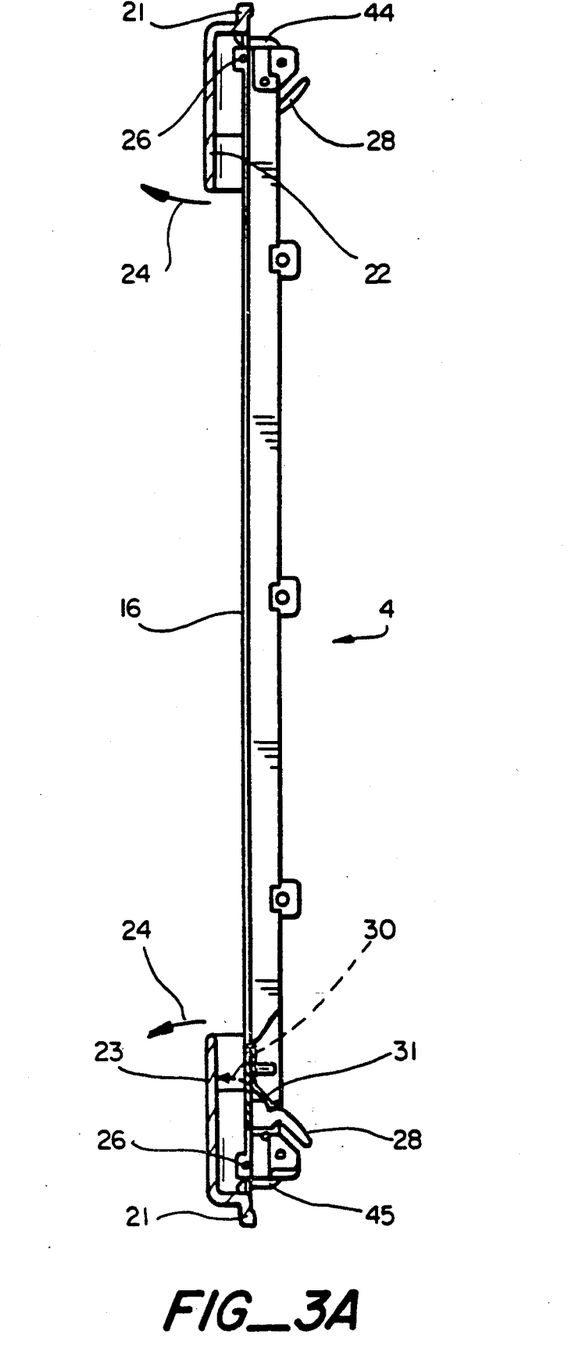
FIGS. 3A and 3B are additional side and front views of a face plate for a printed circuit board assembly of the invention.

FIGs. 2A and 3A illustrate another aspect of the invention, that of providing a user friendly relatively fail-safe manner of gracefully electrically disabling a critical board and enabling a copy of the critical board i.e. a redundant critical board, prior to and upon removal of the critical board. Referring to these figures, upon inserting a printed circuit board assembly 4 into a rack housing 2, extensions 21 extending from upper and lower faces of face plate handles 22, 23 engage extension bosses (not shown) on an inside front surface of the rack housing 2 so as to securely hold the printed circuit board assemblies 4 in the rack housing 2 and prevent their removal therefrom without deliberate and meaningful effort on the part of any craftsperson. To remove any printed circuit board assembly 4 from the rack housing 2, both the upper and lower handles 22, 23 are required to be rotated along the direction of the arrows 24 about pivot pins 26. Rotation of the lower handle 23 likewise moves an extension plate 28 intricately fixed to the handle 23 along a path indicated by the dotted arrow 30. As FIG. 2A illustrates, when the handle 23 is in its closed position, the extension plate 28 is disposed within an optical switch 32, and as the dotted arrows 30 clearly illustrate, upon rotating the lower handle 23 prior to removal of the printed circuit board assembly 4 from the housing 2, the extension plate 28 is moved away from and out of an interior of the optical switch 32, which is fixably secured to the printed circuit board 14. The optical switch 32 includes a light emitter 33 on one of its faces and a light detector 34 on an opposite face, with the extension plate being disposed between the emitter and detector when the handle 23 is in its closed position. Accordingly it is evident that when the lower handle 23 is in its closed position, the extension plate 28 interrupts the path between the light emitter and light detector 33, 34 so that the detector detects a LOW signal, and that upon rotating the lower handle 23 prior to removing the printed circuit board assembly 4, the extension plate 28 is removed from an interior of the optical switch 32 allowing the photodetector 34 to detect a continuous light beam being emitted by the light emitter 33 and hence a HIGH signal. Upon detection of this light beam 34, circuitry associated with this critical board instructs the telecommunications system to gracefully disable the critical board soon to be removed and to enable its redundant board, the graceful transition occurring during any one of predetermined graceful instants by a network system microprocessor, such as between information frames or superframes for example. It is readily evident that such circuitry can operate to make this transition from a primary critical board to a redundant critical board in a matter of a few milliseconds, far quicker than a craftsperson could actually remove the primary critical board. Accordingly, the telecommunications system never has to enter a failure switching mode which can cause switching between a primary critical board and a redundant critical board in the middle of a packet or byte in the middle of a communications frame which is less graceful than a planned graceful switching. Upon rotating the upper and lower handles 22, 23, the printed circuit board assembly 4 is then removed by a craftsperson which then disengages a plurality of electrically conductive pins 36 disposed on a rear face of the printed circuit board 14 from mating electrical pin contacts associated with the rack housing 2.

Reference numeral 31 in FIG. 3A illustrates a retention flexible spring member 31 which functions to maintain positive closing force on the extension plate 28 and hence the lower handle 23 when it is in its closed position, and similarly positive open retention force which tends to keep the lower handle open when it is at its open position. Reference numeral 35 (FIG. 2B) represents heat sink elements for the printed circuit board.

According to the invention as described, eminent removal of the board is signified by the detector going HIGH. Such removal could be signified by the detector going LOW as well. For example, when the handle 23 is in the closed position, the plate 28 could be constructed so that a hole therein is aligned with a line of sight between the emitter 33 and the detector 34, and upon opening the handle 23 an elongated solid extension of the plate could be shaped so as to be positioned between the emitter and detector.

The optical switch of the invention is advantageous over mechanical switches since mechanical switches require relatively strict manufacturing tolerances. In addition, since the switch is intended to operate very infrequently, mechanical switches which generally utilize electrical contacts have the potential of becoming inoperable over time, primarily due to corrosion of either moveable mechanical parts or corrosion of the infrequently used electrical contacts. On the other hand, the reliability of the optical switch of the invention is far superior to that of mechanical switches since only the extension plate is required to be moveable, and its movement is automatic with that of the handle. Also the dimensional tolerances of the extension plate are not critical since it can loosely fit within the switch 32, and the reliability of low cost optical transmitters and receivers is quite high as are their lifetimes.

A further feature of the invention is the provision of an electrostatic discharge (ESD) lever 38 which is fixably attached to and is electrically conductive with both the face plate 16 and the printed circuit board 14. The ESD lever 38 is oriented such that an electrically conductive extension 40 thereof comes into electrical conductive contact with a bottom surface of the rack housing 2 upon insertion of the printed circuit board assembly 4 into the rack housing 2 prior to any of the electrical conductive pins 36 coming into electrical contact with any electrical contacts associated with the rack housing 2. Accordingly, any electrostatic charge on the printed circuit board 14 or on a craftsperson inserting the printed circuit board 14 will positively be grounded by the rack housing 2 safely without being discharged by initial contact between any of the pins 36 or their associated contacts. This construction is less complicated in design and more economical than the provision of a special elongated grounding electrically conductive pin located on the back of a printed circuit board, as has been proposed in the prior art.

Figure 3B:
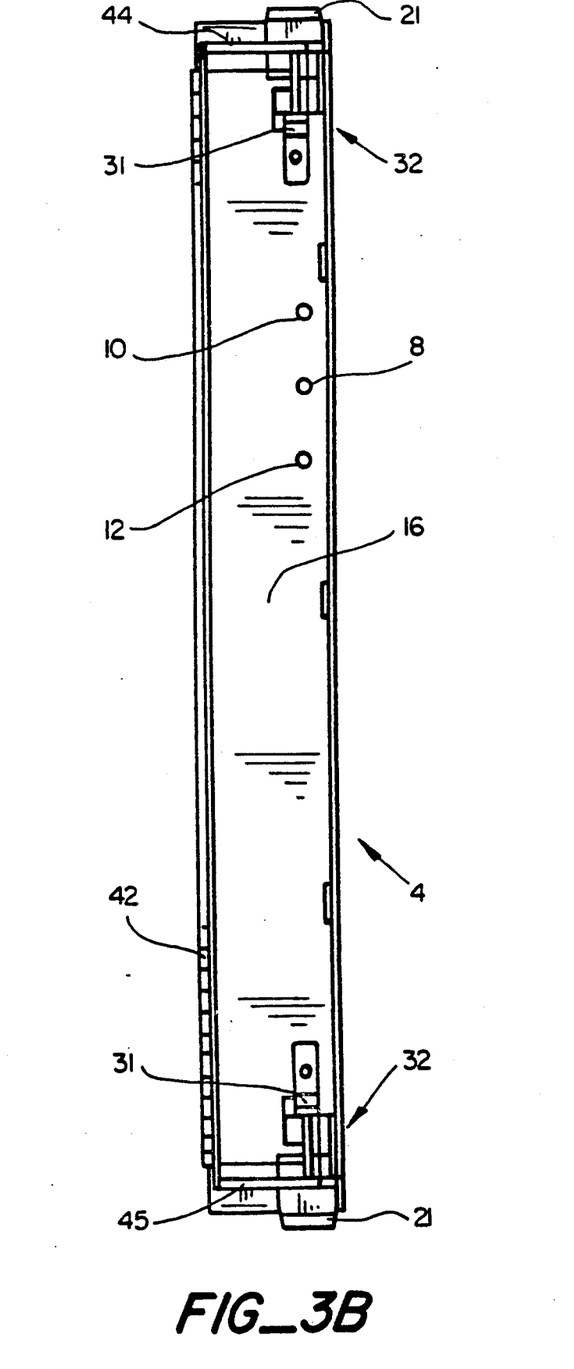

A final feature of the invention is the provision of a corrugated side electromagnetic interference (EMI) shield 42 and associated top and bottom EMI shields 44, 45 disposed on a top and bottom edge of the face plate 16. The elongated EMI shield 42 comprises a series of tightly spaced rectangular-shaped and convexly-curved corrugated members 42, this shield preferably being manufactured as a gasket and separately attached to one side surface of the face plate 16. The gasket is oriented such that a curvature of the members projects a flattened surface thereof away from the face plate side with the flattened surfaces resiliently contacting a side of a face plate associated with another adjacent face plate. The rack housing and printed circuit board assemblies are constructed such that the EMI shield 42 contacts adjacent face plates, and so that the shields 44, 45 contact the rack housing, which is conductive with the shields 44, 45, the face plates 16 and hence the shields 42. This construction positively prevents any significant electromagnetic radiation from leaking along an interface between adjacent printed circuit board assemblies or from a front of the rack housing, and the independently corrugated structure allows positive essentially continuous contact between adjacent printed circuit board assemblies 4 along their entire length irrespective of minor manufacturing imperfections which may cause slight bowing between sides of adjacent printed circuit board assemblies 4. The elongated EMI shield 42 is only provided on one side of the face plate, since EMI protection on the opposite side of any given face plate will be provided by a similar shield secured to face plate adjacent this opposite side in the rack housing 2. The top and bottom EMI shields 44, 45 located on upper and lower edges of the face plate provide EMI protection along these edge surfaces, thus resulting in a 360 angular degree EMI protective shield so that any significant EMI leakage from a front of the rack housing 2 is positively prevented.

Though the invention has been described by reference to certain preferred embodiments thereof, the invention is not to be so limited and is to be limited only by the appended claims.

What is claimed is:

1. A printed circuit board apparatus which is removeably contained in a printed circuit board housing, comprising:
   a printed circuit board on which electrical elements are fixed;
   a face plate attached to a front end of the printed circuit board;
   a moveable handle attached to and extending from the face plate which is moveable between first and second positions;
   means for securing the board and the face plate to the housing when the handle is in its first position and for releasing the board and the face plate from the housing when the handle is in its second position so that the board can be removed from the housing and upon removal electrical contacts contained in the housing are electrically disconnected from electrical pins extending from a back end of the board, the electrical contacts being part of an electrical path for signals being transmitted between the board elements and other electronic components;
   an optical switch including a light emitter, a light detector for detecting light emitted by the light emitter, and means for instructing at least one of the other electronic components to gracefully inactivate the printed circuit board and switch to a redundant printed circuit board when an output level of the detector is changed by moving the handle between its first and second positions.

2. The apparatus of claim 1, the instructing means instructing the switch to the redundant printed circuit board when an output of the detector goes HIGH.

3. The apparatus of claim 1, the instructing means instructing the switch to the redundant printed circuit board when an output of the detector goes LOW.

4. The apparatus of claim 1, the face plate being electrically connected to the printed circuit board, the face plate including a deflectable electrically conductive lever oriented such that upon inserting the printed circuit board into the housing the conductive lever makes electrical contact with an electrically conducting portion of the housing prior to any of the electrical pins making electrical contact with any of the housing electrical contacts so as to discharge to ground any electrostatic charge associated with the printed circuit board.

5. The apparatus of claim 4, further comprising a metallic corrugated gasket having short adjacent segments along a length thereof, each segment having a resilient convex shape, the gasket being secured to an elongated side of the face plate such that a curvature of the segments projects a flattened surface thereof away from the face plate side with the flattened surfaces contacting a side of a face plate associated with another adjacent printed circuit board assembly so as to provide an electromagnetic interference shield between adjacent face plates.

6. The apparatus of claim 5, further comprising top and bottom electromagnetic interference shields located on top and bottom sides of the face plate for providing further EMI shielding.

7. A printed circuit board apparatus which is removeably contained in a printed circuit board housing, comprising:
   a printed circuit board on which electrical elements are fixed;
   a face plate attached to a front end of the printed circuit board and being electrically connected thereto, the face plate including a deflectable conductive lever oriented such that upon inserting the printed circuit board into the housing the conductive lever makes electrical contact with an electrically conducting portion of the housing prior to any electrical pins extending from a back end of the printed circuit board making electrical contact with any associated electrical pin contacts associated with the housing so as to discharge to ground any electrostatic charge associated with the printed circuit board.

8. The apparatus of claim 7, further comprising:
   means for securing the board and the face plate to the housing when the handle is in its first position and for releasing the board and the face plate from the housing when the handle is in its second position so that the board can be removed from the housing and upon removal the electrical contacts contained in the housing are electrically disconnected from the electrical pins extending from a back end of the board, the electrical contacts being part of an electrical path for signals being transmitted between the board elements and other electronic components;

an optical switch including a light emitter, a light detector for detecting light emitted by the light emitter, and means for instructing an electronic components electrically connected to the contacts to gracefully inactivate the printed circuit board and switch to a redundant printed circuit board when an output level of the detector is changed by moving the handle between its first and second positions.

9. A host terminal for a telecommunications system, comprising:

a rack housing;

a plurality of printed circuit board assemblies removeably contained in the rack housing, each printed circuit board assembly having a front edge secured to a face plate, each face plate having a common configuration such that each has an identical arrangement of holes in a front surface thereof to allow a craftsperson visual inspection of LEDs to be associated with any hole, the arrangement of holes being capable of accommodating any LED arrangement permutation required by any board assembly being housed in the rack housing, each printed circuit board assembly having a label secured to a front face of its associated face plate, each label having holes only at locations which correspond to those areas where LEDs to be visually inspected associated with a corresponding printed circuit board are to exist such that face plate holes which do not have LEDs to be visually inspected are covered by the labels.

10. The host terminal of claim 9, each label having written indicia thereon specifying an identity of its associated printed circuit board and which identifies a function represented by each of its board LEDs.

11. The terminal of claim 10, the rack housing accommodating at least ten circuit board assemblies.

12. The host terminal of claim 9, at least one of the printed circuit board assemblies including:

a moveable handle attached to and extending from the face plate, the handle being moveable between first and second positions;

means for securing the board and the face plate to the housing when the handle is in its first position and for releasing the board and the face plate from the housing when the handle is in its second position so that the board can be removed from the housing and upon removal electrical contacts contained in the housing are electrically disconnected from electrical pins extending from a back end of the board, the electrical contacts being part of an electrical path for signals being transmitted between the board elements and other electronic components;

an optical switch including a light emitter, a light detector for detecting light emitted by the light emitter, and means for instructing at least one electronic component electrically connected to the contacts to gracefully inactivate the printed circuit board and switch to a redundant printed circuit board when an output level of the detector is changed by moving the handle between its first and second positions.

13. The host terminal of claim 12, the face plate being electrically connected to the printed circuit board, the face plate including a deflectable conductive lever oriented such that upon inserting the printed circuit board into the housing the conductive lever makes electrical contact with an electrically conducting portion of the housing prior to any electrical pins extending from a back end of the printed circuit board making electrical contact with any associated electrical pin contacts associated with the housing so as to discharge to ground any electrostatic charge associated with the printed circuit board.

14. The host terminal of claim 13, further comprising:

a metallic corrugated gasket having short adjacent segments along a length thereof, each segment having a resilient convex shape, the gasket being secured to an elongated side of the face plate such that a curvature of the segments projects a flattened surface thereof away from the face plate side with the flattened surfaces contacting a side of a face plate associated with another adjacent printed circuit board assembly so as to provide an electromagnetic interference shield between adjacent face plates; and top and bottom electromagnetic interference shields located on top and bottom sides of the face plate for providing further EMI shielding.

* * * * *